United States Patent [19]
Cleveley et al.
[11] 3,899,639
[45] Aug. 12, 1975

[54] SYSTEM AND METHOD FOR READING REMOTELY LOCATED METERS

[75] Inventors: John B. Cleveley; Kenneth C. Laubman, both of Edmonton, Canada
[73] Assignee: The City of Edmonton, Edmonton, Canada

[22] Filed: May 11, 1973
[21] Appl. No.: 359,245

[52] U.S. Cl. .......... 179/2 A; 340/150; 340/147 R; 340/180
[51] Int. Cl. .......... H04q 9/00
[58] Field of Search .......... 179/2 A, 2 R; 340/180, 340/150, 172, 147 R

[56] References Cited

UNITED STATES PATENTS

| | | | |
|---|---|---|---|
| 3,588,357 | 6/1971 | Sellari, Jr. | 179/2 A |
| 3,778,771 | 12/1973 | Whitaker | 340/150 |

*Primary Examiner*—Kathleen H. Claffy
*Assistant Examiner*—Tommy P. Chin
*Attorney, Agent, or Firm*—Max L. Wymore

[57] ABSTRACT

A telephone number calling unit is programmed by a computer to dial data calls to selected telephone numbers by operating telephone line switching circuitry to connect a selected set of telephone lines to the computer through centrally located telephone test trunk circuitry and a meter reading transponder associated with the selected telephone lines transmits meter reading data over the set of telephone lines to the computer. The system includes circuitry for interfacing the computer, calling unit and test trunk. The system operates to abort a call and reset whenever the test trunk or the telephone line switching circuitry encountered is busy, the set of telephone lines called is busy or its associated telephone set goes off-hook during a reading attempt, or if the time elapsed for a transponder interrogation becomes excessive. A major portion of the meter reading system is preferably located remotely from the centrally located test trunk circuitry.

21 Claims, 12 Drawing Figures

SYSTEM AND METHOD FOR READING REMOTELY LOCATED METERS

The present invention relates to reading remotely located meters, such as electric, gas and water utility meters. More particularly, the present invention relates to the reading of such meters via the standard subscribers' telephone line networks.

Systems for reading remotely located utility meters have as their object the elimination of periodically sending meter readers to subscribers' residences and places of business in order to make manual meter readings.

Heretofore, various arrangements have been devised for reading remotely located utility meters through subscribers' telephone lines. Such prior art remote meter reading systems have generally, however, been subject to one or more of the following disadvantages. One common disadvantage is that the prior art systems are too complicated and expensive to be economically feasible. Another disadvantage is that the prior art systems can only be operted through the use of expensive telephone company auxiliary equipment. Another disadvantage is that the operation of certain prior art systems is limited to a serial sequential scanning of the subscribers' residences and places of business in the order of their line appearances. Such a serial sequential reading of meters has proved to be undesirable since gas, electric and water companies may have different zones in which different billing rates are applicable and these zones most probably do not correspond with the sequential numbering of subscribers' line appearances. Thus, with a prior art remote meter reading system which sequentially scanned subscribers' line appearances, a reading of only those utility meters in a selected billing zone could not be made.

It is, accordingly, an object of the present invention to provide an improved system and method for reading remotely located meters through telephone line networks.

It is further an object of the present invention to provide an improved remote meter reading system as set forth which utilizes and shares presently existing central office telephone company circuitry and is compatable with existing telephone test trunk networks.

It is also an object of the present invention to provide an improved remote meter reading system as set forth which is capable of reading meters located at telephone subscribers' residences and places of business by placing telephone calls thereto in any desired sequence so that batch readings of utility meters in selected billing zones may be readily made.

It is additionally an object of the present invention to provide a remote meter reading system as set forth in which major portions of the equipment making up the remote meter reading system may be located remotely from the central office telephone company circuitry with which it is used, thereby the equipment making up the majority of the capital investment in the remote meter reading system may be located on premises other than those of the telephone company, such as on the utility company premises.

It is another object of the present invention to provide improved circuitry for interfacing a computer, an automatic calling unit and remotely located telephone company trunk circuitry thereby to form a remote meter reading system for reading through subscribers' telephone lines utility meters located at subscribers' residences and places of business.

It is yet another object of the present invention to provide a remote meter reading system which includes improved circuitry for interfacing with conventional test trunk circuitry located at a telephone company office.

It is still another object of the present invention to provide an improved system and method for placing data calls over telephone lines to remotely located meter reading equipment characterized by selectively aborting the data call if certain conditions are encountered.

In accomplishing these and other objects, there is provided in accordance with the present invention a system for selectively reading remotely located utility meters through standard subscriber telephone line networks. The system utilizes conventional test trunk circuitry located at a remote central telephone company office and the access to the subscribers' telephone lines is provided by the telephone test trunk circuitry.

The system includes a computer, a calling unit, and circuitry for interfacing the computer and central office test trunk circuitry. The computer, calling unit and a major portion of the interfacing circuitry may be located remotely from the telephone company office containing the test trunk circuitry.

Associated with the utility meters at each subscriber's residence or place of business and connected with each subscriber's telephone line are transponders. Each transponder stores information representative of the readings on the one or more utility meters associated therewith and when interrogated by the remote meter reading system outputs this meter reading data over the subscriber's telephone line. The outputted data is transmitted through the test trunk circuit and interfacing circuitry to the computer. The computer appropriately stores and/or processes this data to compute the amount to be billed each subscriber for utilities used during the billing period.

In the remote meter reading system, the telephone numbers of the subscribers to be called are programmed into the computer via punched cards or magnetic tape in the order desired and the computer selectively outputs these telephone numbers to the calling unit thereby to place calls in the order in which the subscribers' telephone numbers are programmed. During each of these calls the remote meter reading system operates to abort the call if the test trunk is busy, a busy switch train is encountered in the telephone line switching circuitry, or if the subscriber's line called is busy. If the test trunk is free, the system seizes the test trunk, indicates to the test center that the test trunk is seized, seizes the subscriber's telephone line and interrogates the transponder associated with the seized subscriber's line to read the meter reading data outputted by the transponder into the computer. If the subscriber picks up his telephone during the call, that is to say the subscriber's telephone goes off hook, the meter reading call is automatically aborted by the system.

Additional objects of the present invention reside in the specific construction of the exemplary remote meter reading system hereinafter particularly described in the specification and shown in the several drawings.

Figure 1:
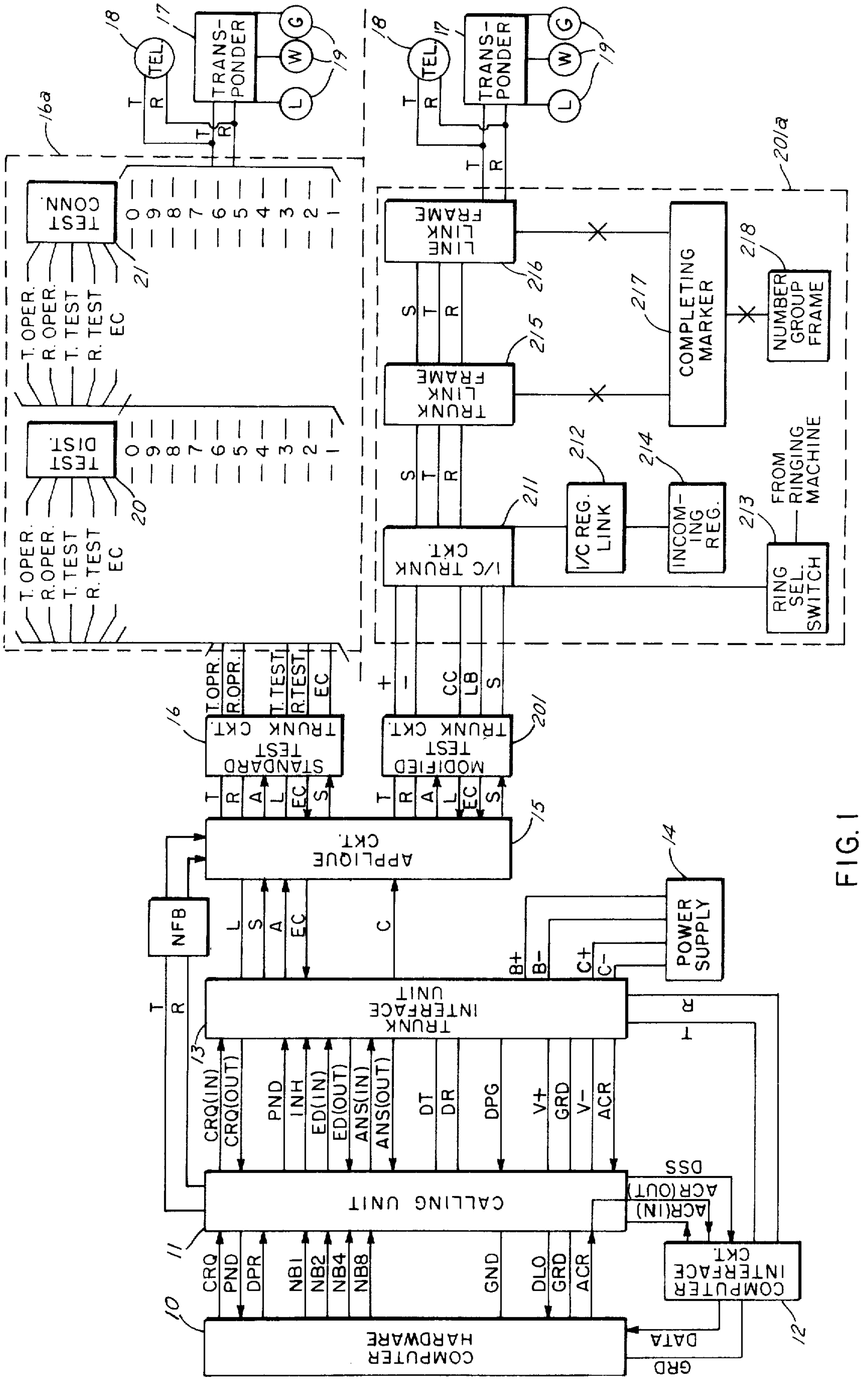
FIG. 1 is a block diagram of a remote meter reading system according to the present invention.

Referring to the drawings in more detail, there is shown in FIGS. 1–10 one embodiment of remote meter reading system according to the present invention. The system as shown in FIG. 1 is formed by a computer 10, a calling unit 11, a computer interface circuit 12, a trunk interface circuitry 13, a power supply 14, an applique circuit 15, a plurality of telephone test trunk networks 16 and 201, a plurality of 10,000 line telephone line units 16a and 201a and an exemplary meter reading transponder 17 associated with a subscriber's telephone set 18. The transponder 17 is illustrated as being connected to read a multiplicity of transducers which may be utility meters 19, such as a water, gas and electric meter.

The conventional 10,000 line unit 16a is made up of test distributor, test selector and test connector circuits 20 and 21 which are compatible with the standard test trunk circuit 16. The conventional 10,000 line unit 201a includes an I/C trunk circuit 211, I/C register link 212, a ring selector switch 213, an incoming register 214, a trunk link frame 215, a line link frame 216, a completing marker circuit 217, and a number group frame 218. The 10,000 I/C unit 201a is compatible with the I/C type test trunk circuit 201.

The computer 10 is a standard business machine computer equipped with hardware which may be programmed to originate calls in any order desired to subscribers at selected telephone numbers. The computer 10 is connected to transmit electrical signals on electrical leads CRQ, DPR, NBI, NB2, NB4 and NB8 to the calling unit 11. A common electrical ground lead designated GRD is interconnected between the computer 10 and the calling unit 11 and also between the computer 10 and the computer interface circuit 12.

The computer 10 is connected to receive electrical signals on electrical leads DLO and PND from the calling unit 11. A computer data line designated DATA is connected from the computer interface circuit 12 to the computer 10. Data representing meter readings, after being checked by the computer interface circuit 12, is transmitted therefrom over the DATA line to the computer 10. The business machine type computer 10 operates in a conventional manner reading in, storing and processing the data received on its DATA line to compute subscribers' utility bills for the billing period.

Calling unit 11 may be modified Western Electric 801A type "any number" dial pulse automatic calling unit. The calling unit 11 provides the business machine computer 10 with means for originating a data call through the telephone test switching circuitry forming a switch access through the test trunk networks 16 and 201. As before mentioned, the telephone numbers to be dialed are stored in the preselected order desired in the computer 10.

In addition to the aforementioned electrical signals associated with the calling unit 11, the calling unit 11 is connected to transmit electrical signals on leads CRQ(IN), PND, INH, ED(IN) and ANS(IN) to the trunk interface circuit 13, to transmit electrical signals on leads lead and DSS to the computer interface circuit 12, and to transmit dialing pulses or tones on electrical leads T and R through the applique circuit 15 to the test trunk network 16, 201 and to the remote 10,000 line central telephone offices 16a, 201a via conventional telephone line switching circuitry. The calling unit 11 is connected to receive electrical signals on leads CRQ(OUT), ACR, DPG, ED(OUT) and ANS(-OUT) from the trunk interface circuit 13 and to forward electrical signals on lead ACR(OUT) to the computer interface circuit 12.

Electrical leads designated DT and DR are interconnected between the calling unit 11 and the trunk interface circuit 13. One set of electrical leads having leads designated T and R are interconnected between the calling unit 11 and the applique circuit 15. Another set of electrical leads having leads designated T and R has its T and R leads connected from the DT and DR leads, respectively, to the computer interface circuit 12.

Voltage buses designated V+, V− and GRD which are for supplying electrical power are interconnected between the calling unit 11 and the trunk interface circuit 13. The designation GRD indicates voltage ground while the voltages V+ and V− are preferably approximately +18 and −18 volts DC, respectively.

The trunk interface circuit 13, in addition to receiving and transmitting electrical signals on those leads above-mentioned in connection therewith, is connected to transmit electrical signals on leads S and A to the applique circuit 15 and to receive electrical signals on leads L and EC therefrom. The power supply 14, which is conventional in construction, is connected to supply DC voltages C+, C−, B+ and B− to the trunk interface circuit 13. The DC voltages C+ and C− provide the electrical power for illuminating status lamps in the trunk interface circuit 13. Preferably, the C+ and C− voltages are, respectively, +6.3 and −6.3 volts. The B+ and B− voltages provide the electrical power for energizing the TB relay included in the circuit 13. The B+ and B− voltages are preferably floating 50 volts DC. An electrical signal line C is also shown connected between the trunk interface circuit 13 and applique circuit 15. Switching signals may be selectively transmitted on the line C to connect the applique circuit 15 to any selected one of the test trunk circuits 16 and 201.

The applique circuit 15 functions to connect the calling unit 11 and the trunk interface circuit 13 with a selected one of the test trunk networks 16 or 201. The applique circuit 15 receives and retransmits those electrical signals hereinbefore mentioned. Also, the applique circuit 15 receives electrical signals on leads L and EC from the telephone trunk networks to which it is switched and transmits electrical signals on leads S and A thereto. A set of electrical leads having leads designated T and R is connected between the applique circuit 15 and the test trunk networks.

Each of the telephone test trunk networks illustrated in FIG. 1 is a conventional test trunk circuit and provides access to a selected number of telephone lines through 16a or 201a. Each unit 16a and 201a has, for example, 10,000 sets of subscriber telephone lines and switching circuitry associated therewith which is responsive to dial pulses or tones to connect a selected set of telephone lines to its associated trunk circuit. The test trunk networks function to interconnect or access a selected set of subscriber telephone lines into the meter reading system so that the meter reading transponder 17 associated therewith may be interrogated. As abovementioned, conventional telephone line switching circuitry associated with the telephone test trunk units 16a or 201a switched by means of a telephone switching test train circuit or switching arrangement associated with the test trunk network 16 and 201. This switching arrangement is operated in a conventional manner in response to dial pulses or tones over electrical leads T and R to interconnect or access the meter reading transponder through the subscriber's telephone test trunk network 16a or 201a corresponding to the telephone number called by the calling unit 11.

One exemplary set of telephone lines of one of 10,000 line test trunk networks or units is shown in FIG. 1 connected to the subscriber's telephone set 18 with which it is associated. The set of telephone lines is made of the T(tip) and R(ring) leads.

Five electrical lines designated T(test), R(test), EC, T(operate) and R(operate) are connected between each test trunk network and their associated 10,000 line unit. The subscriber lines T(test) and R(test) are used during the triggering and interrogation of the transponder. The line EC is for transmitting a busy signal from the 10,000 unit test trunk circuitry to the test trunk circuit. The telephone set is accessed from the test trunk in a conventional manner and will generate one electrical signal on the EC line to cause a data call to be aborted whenever a busy switch train is encountered in the test trunk or a busy subscriber's line is encountered.

The T and R leads of the set of telephone lines, in addition to being connected with the telephone set 18, are also connected with its associated transponder 17. The lines T and R function to carry on interrogating signal, for unlocking the transponder 17 from the meter reading system, to the transponder, function to transmit to the meter reading system data representing meter readings outputted by the transponder 17, and also function to convey electrical signals from the telephone set 18 which indicate during a data call that the telephone receiver has been picked up and thus that the telephone set 18 has gone off-hook. The meter reading system in response to these last described electrical signals aborts the data call being made over the subscriber's telephone lines.

The transponder 17 is connected to three utility meters 19 which may be, for example, the subscriber's water, gas and electric meters. The transponder 17 reads the changing readings on each of the meters or devices 19 and converts the information into a selected bit code suitable for transmission over the telephone lines to the computer 10.

The transponder 17 operates in response to an interrogating tone signal or access code generated by the computer interface circuit 12 to transmit a suitable coded tone for transmission over the telephone lines T and R. The coded bits of information are transmitted to the computer 10 via the computer interface circuit 12 and the computer interface circuit 12 operates to receive the coded information, check the information, and forward it along with the appropriate stop-start bits to the computer 10.

It is noted that other suitable types of transponders, operable to read the meters or devices 19, convert the meter reading information into data suitable for transmission to the computer 10, and output the meter reading information in response to an interrogating signal or code, may be employed as the transponder 17. Depending on the specific transponder employed, the meter reading system may be arranged to generate an interrogating signal compatable therewith.

It should also be noted that to modify the above circuitry to a multi-frequency sending system would merely require substituting a modified Western Electric Automatic Calling Unit Model 801C series for the 801A model or such other suitable calling unit which will accept and handle multi-frequency operation.

Before proceeding with a description of the exemplary circuitry shown in FIGS. 2–10 included in the calling unit 11, the trunk interface circuit 13 and the applique circuit 15, the preferred locations of the components of the meter reading system shown in FIG. 1 are here set out. The test trunk networks 16 and 201 along with associated telephone switching circuitry are located at central telephone company offices. The computer 10, the calling unit 11, the computer interface circuit 12, the trunk interface circuit 13 and the power supply 14 may all preferably be located together remotely from the central telephone company office whereat the test trunk networks 16 and 201 are located, such as several wire miles apart therefrom. The applique circuit 15, which functions to connect the remotely located portion of the meter reading system with the test trunk networks 16a and 201a may be located at various telephone company offices associated with the test trunks 16 of 201. Location of the components of the meter reading system as above-described has the advantage of permitting placement of the expensive portions of the meter reading system in the utility company's premises instead of on telephone company premises.

Figure 2:
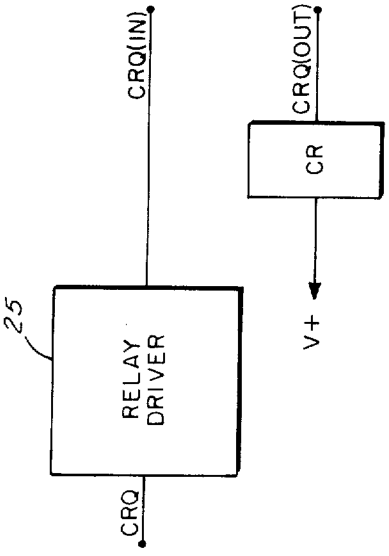

Circuitry included in the calling unit 11 is shown in FIGS. 2–8. A conventional relay driver 25 associated with a relay designated CR is shown in FIG. 2.

The relay CR has one terminal connected to V+ voltage and its other terminal connected to the lead CRQ(OUT) extending from the trunk interface circuit 13. The relay drive 25 is connected to receive an input on the CRQ lead from the computer 10 and operates to generate in response thereto an output effective to energize the CR relay on the CRQ(IN) lead. The CRQ(IN) lead extends to the trunk interface circuit 13.

As used herein, the terms normally open and normally closed refer to the state of a set of contacts of a relay when the relay is deenergized. When a relay is deenergized, each normally open set of relay contacts is open to prevent the flow of electric current therethrough while each normally closed set of contacts is closed to permit the flow of electric current therethrough. Energization of a relay reverses the state of its contacts, i.e., makes of closes its normally open sets of contacts and opens or breaks it normally closed sets of contacts.

Figure 3:
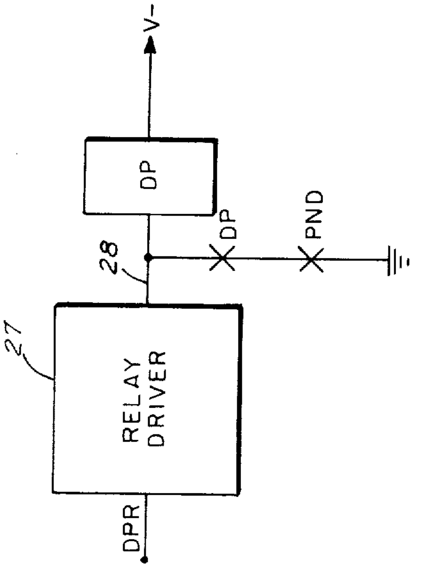

Referring to FIG. 3, a conventional relay driver 27 is there shown connected to receive an input signal from the computer 10 and the DPR lead. The relay driver 27 generates in response to an input on lead DPR, a ground on output lead 28 to drive a relay DP. The relay DP has one terminal connected to the electrical lead 28 and its other terminal connected to V− voltage. A hold path for the DP relay is provided by connecting the output lead 28 to ground through normally open sets of contacts of relays DP and PND.

Figure 4:
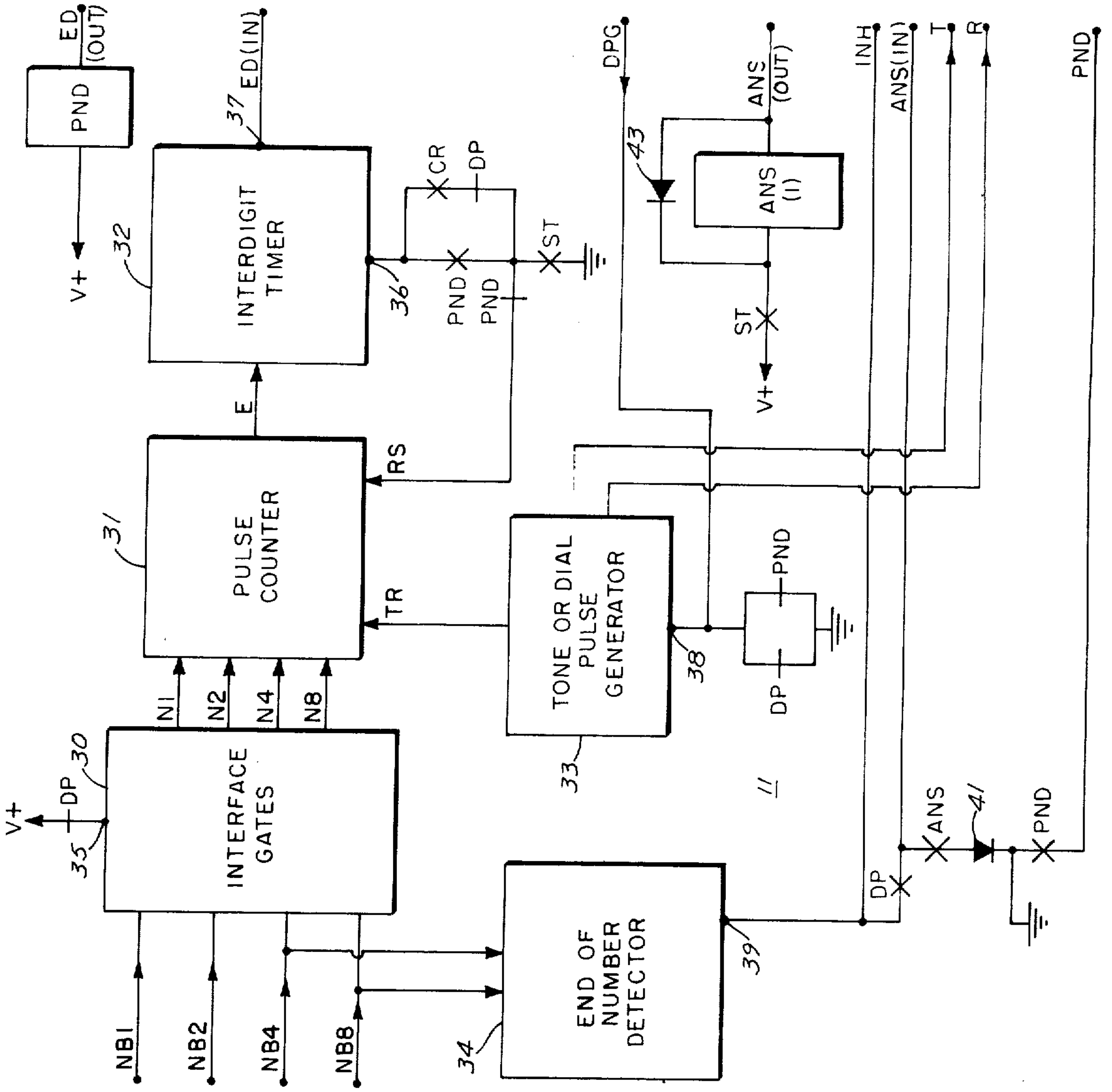
FIGS. 2–7 are diagrams of exemplary circuitry included in the calling unit of FIG. 1.

The circuitry of the calling unit 11 operable to make a data call by dial or tone pulsing a selected subscriber's telephone number is shown in FIG. 4. There shown are interface gates 30, a pulse counter 31, an interdigit timer 32, a dial pulse or tone generator 33 and an end of number detector 34.

The interface gates 30 are connected to receive from the computer 10 on binary leads NB1, NB2, NB4, and NB8 number signals representing each digit to be dialed or tone pulsed. Each digit to be dialed or tone pulsed is set in binary form by the computer 10 on the NB leads. The least significant binary digit is set on lead NB1, the next significance is set on NB2 and so on as is standard in binary notation.

The gates 30 have output leads N1, N2, N4 and N8 connected therefrom to the pulse or tone counter 31. The output leads N1, N2, N4 and N8 correspond, respectively, to the input leads NB1, NB2, NB4 and NB8. The interface gates 30 operate in a conventional manner when enabled to gate the binary inputs on the NB leads to the respective output N leads. Each binary input signal is translated by the interface gates 30 to a coresponding binary output signal with the exception that the input of a binary zero is converted by the gates 30 into a binary 10 output. The interface gates 30 are enabled upon energization of the DP relay by the opening of the normally closed contacts of the relay DP connected between V+ voltage and the interface gates terminal 35.

The pulse counter 31 functions as a binary counter and is composed of four identical flip-flop stages which are initially set to binary ones by a ground on the reset lead RS. The ground to reset the counter 31 is applied to the RS lead through normally closed contacts of the PND relay and made contacts of actuated relay ST, FIG. 8*a*. When the DP relay operates, any binary zeroes in the number to be dialed are set into the counter 31 on the N leads the instant the interface gates 30 are enabled.

The counter 31 receives a clock pulse from the conventional dial pulse or tone generator 33. The counter 31 is counted down by the clock pulses received from the number to be dialed initially set on its flip-flop stages until all stages of the counter 31 are set to zero. The counter 31 operates once its stages are counted down to zero to generate the end of count or end of digit output EC which is transmitted to the interdigit timer 32 to trigger the timer 32.

The interdigit timer 32 is a conventional type of circuit which may be triggered when enabled by energization of the ST relay into one state; a relay deenergizing state, by the counter output EC; and, into its other state, a relay energizing state, by grounding its terminal 36. The timer 32 generates one output on its output terminal 37 when triggered into its first state by the counter output EC and generates a different output on its output terminal 37 after a built-in time delay, such as up to 600 milliseconds, when triggered into its other state by the application of a ground to its terminal 36. Ground is connected to the timer terminal 36 through two electrical paths. One electrical path includes a set of normally open contacts of each of the relays ST and PND. The other electrical path includes a set of normally open contacts of each of the relays ST and CR and also a set of normally closed contacts of the relay DP.

The output signal fo the interdigit timer 32 is transmitted via ED(IN) through relay contacts 135 in the trunk interface circuit 13 to drive the PND relay. The PND relay has one terminal connected to V+ voltage and its other terminal connected to the ED(OUT) lead. the ED(OUT) lead is connected to the trunk interface 13. The output terminal 37 of the interdigit timer 32 is connected to the ED(IN) lead which lead is connected to the trunk interface 13. The output generated on the ED(IN) lead when the timer 32 is triggered by the counter output EC is operable to deenergize the PND relay when transmittd thereto. The timer 32 output generated by grounding is terminal 36 is operable to energize the PND relay when transmitted thereto and, for example, may be an electrical ground.

The dial pulse or tone generator 33 includes a free running multi-vibrator and generates when enabled corresponding clock and dial pulses or tones on, respectively, its output leads designated T and R to the applique circuit 15. The pulse or tone generator 33 is held on an idle or disabled state by grounding its terminal 38. Removal of the ground from terminal 38 enables the generator 33.

Connected to the generator terminal 38 is the DPG lead extending from the trunk interface 13. Ground is connected to the terminal 38 through parallel connected normally closed sets of contacts of the relays DP and PND. Ground is connected to terminal 38 through DPG on receipt of the end of number code to inhibit the tone or dial pulse generator 33.

The pulses or tones generated on the generator output leads and T and R are transmitted, respectively, through the applique circuit 15 to the telephone test switching circuitry of the network 16 or 201 and 10,000 line unit 16*a* or 201*a* associated with the test trunk network and to the counter 31. The counter 31 counts the clock pulses received, counting down from the number set on its N leads to zero. Thereby, the counter 31 counts the number of dial or tone pulses in a pulse series transmitted over the T and R leads to the test trunk networks 16 and 201. The instant the counter 31 reaches its zero count, it generates the output EC to trigger the interdigit timer into its relay deenergizing state. In this state the interdigit timer 32 generates an output on the ED(IN) lead effective to deenergize the PND relay when transmitted thereto.

Deenergization of the PND relay closes the normally closed contacts of the PND relay to ground generator terminal 38 and disables the dial pulse or tone generator 33. Thereby, each series of dial pulses or tones transmitted to the centrally located telephone test network over leads T and R is equal in number and corresponds to the digit set on the N leads as an input to the binary counter 31. Each series of dial pulses or tones transmitted to the telephone test trunk networks 16 or 201 operates to dial one digit of the telephone number to which a data call is being placed. The digit dialed is the digit outputted by the computer 10 on the leads NB1, NB2, NB4 and NB8 and gated to the counter 31 on the leads N1, N2, N4 and N8 by the interface gates 30. Connected to the leads NB4 and NB8 is the end of number detector 34. The business machine computer hardware 10 opertes to set binary ones on the leads NB4 and NB8 after the final digit of the telephone number has been dialed.

The detector 34 operates in a conventional manner in response to this end of number code, i.e., the setting binary ones of the leads NB4 and NB8, to generate a ground on its output terminal 39. The INH lead extending from the trunk interface 13 is connected directly to the terminal 39. The ANS(IN) lead is connected through a set of normally open relay contacts of the DP relay to the terminal 39. Ground is connected to the ANS(IN) lead through a normally closed set of contacts of the relay DM, a diode 41 and a normally open set of contacts of an ANS relay.

Ground is connected to the PND lead through the set of normally closed contacts of the relay DM abovementioned in connection with the ANS(IN) lead and a normally open set of contacts of the relay PND.

The ANS relay is shown in FIG. 4 with one terminal connected to the ANS(OUT) lead extending from the trunk interface 13. The other terminal of the ANS relay is connected to V+ voltage through a normally open set of contacts of an ST relay. A diode 43 is connected across the terminals of the ANS relay to limit current flow therethrough.

Figure 5:
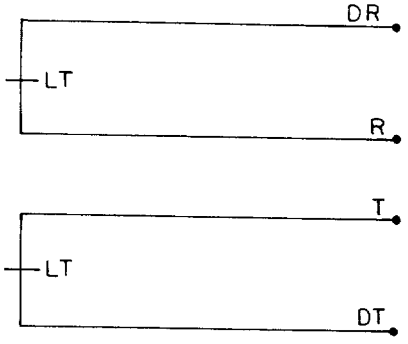

Referring now to FIG. 5, the DR and DT leads extending from the trunk interface 13, calling unit 11 and the R and T leads extending from the applique circuit 15 are there shown. The DR and R leads are interconnected through a set of normally closed contacts of an LT relay, FIG. 8*c*. The DT and T leads are interconnected through another set of normally closed relay contacts of the LT relay.

Figure 6:
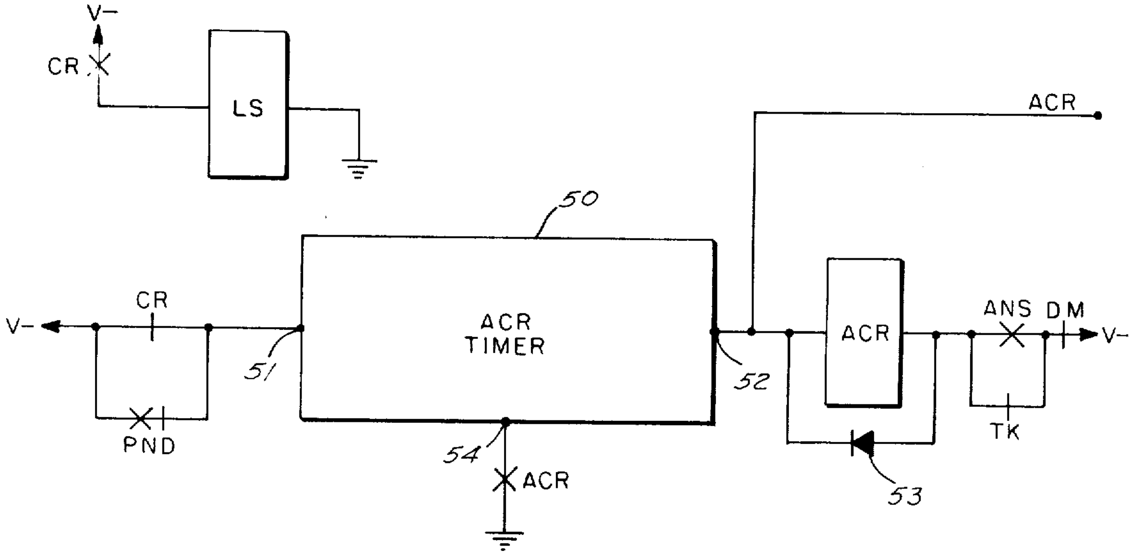

An Abandon Call and Retry (ACR) timer circuit is shown in FIG. 6. The circuit is made up of a conventional RC timer 50 which includes preferably Schmitt trigger circuitry and a relay driver circuit for driving an ACR relay. The timer 50 is adjustable to generate a time interval of predetermined length within a specific range, such as in the range of 7 to 40 seconds.

The ACR timer 50 has an input terminal 51. The V− voltage is connected to the timer terminal 51 through parallel electrical paths provided by, respectively, a make before break set of contacts of the PND relay and through a normally closed set of contacts of the CR relay. The V− voltage, CRQ(OUT) is also connected through a normally open set of contacts of the CR relay to one terminal of the LS relay and the other terminal of the LS relay is connected to ground. Energization of the CR relay removes the V− voltage from the timer terminal 51.

Application of V− voltage to terminal 51 holds the timer 50 in an idle state. Removal of the V− voltage from the terminal 51 starts the timer 50 running. Energization of the PND relay stops and resets the timer 50 by reapplying negative voltage through the make before break contacts to the timer terminal 51. The timer 50, once started by energization of the CR relay, runs the entire selected time interval at which it is preset, if not stopped by energization of the PND relay, and generates, once this preset time has elapsed, an output of an electrical ground on its output terminal 52. The electrical ground output generated on timer terminal 52 is for operating the ACR relay. Operation of the ACR relay causes the meter reading system to abandon or abort a data call and reset.

The ACR relay has one terminal commonly connected to the timer output terminal 52 and to the ACR lead extending from the trunk interface 13. The other terminal of the ACR relay is connected to V− voltage through sets of contacts of the relays ANS and TK. The set of contacts of the ANS and TK relays are, respectively, normally open and normally closed sets of relay contacts. These sets of contacts of the ANS and TK relays are connected in parallel with each other and in series with normally closed contacts DM to V−. A diode 53 is connected across the terminals of the ACR relay to limit current flow therethrough.

The ACR timer 50 has a reset terminal 54. Ground is connected to the terminal 54 through a normally open set of contacts of the ACR relay. Energization of the ACR relay closes its normally open contacts to apply ground to the terminal 54. Application of ground to the terminal 54 recharges the timing capacitors in the timer 50 to a voltage indicating zero time. Thereby, the timer 50 is reset for generating, when restarted, another time interval of preselected length.

Figure 7:
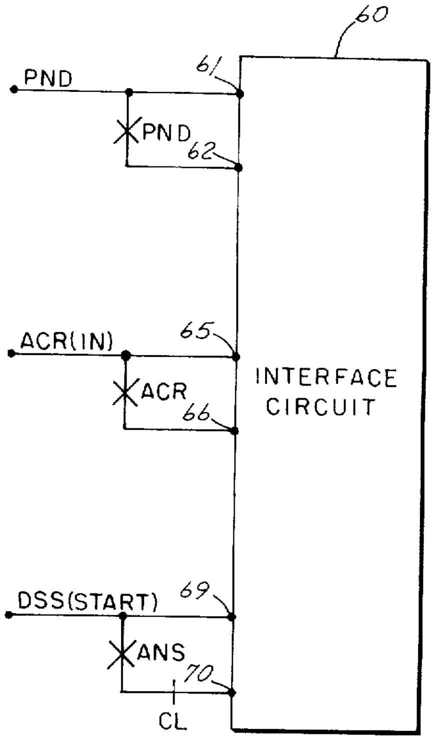

FIG. 7 illustrates the interface leads PND, ACR(IN) and DSS of the calling unit 11. These leads are connected to an interface circuit 60. The circuit 60 has output terminals 61, 62, 65, 66, 69 and 70. The PND lead extends to the computer hardware 10, is connected directly to the terminal 61, and is connected through a normally open set of contacts of the PND relay and through a normally closed set of contacts (not shown) to the terminal 62. The ACR(IN) lead extends to the computer interface 12, is directly connected to the terminal 65 and is connected through a normally open set of contacts of the ACR relay to the terminal 66. The ACR(OUT) lead is connected from the computer interface 12 and in turn is directly connected to computer 10. The DSS(start) lead extends to the computer interface 12, is directly connected to the terminal 69 and is connected through the normally open set of relay contacts of the ANS relay and normally closed set of relay contacts of the CL relay to the terminal 70.

The interface circuit 60 operates in a conventional manner to generate on each of the leads PND and ACR(IN) an output voltage of a first level, such as a positive or negative voltage, when the relays PND and ACR are deenergized, respectively, and to generate an output voltage of a second level, such as V+ or V− volts, when the respective relays are energized. For example, if the relay PND is energized and the relay ACR is deenergized, the following output voltages would appear on these leads: PND-V+ and ACR(IN)-ground. The lead DSS(start) is grounded to provide a start signal to the computer interface 12 through the ANS(1) relay, FIG. 4.

Figure 8A:
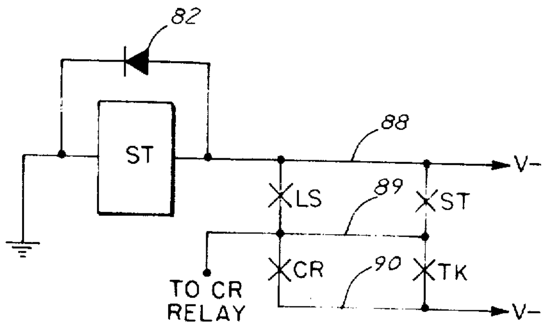
FIGS. 8a–8c illustrate various relays and their associated circuitry included in the calling unit of FIG. 1.
Figure 8B:
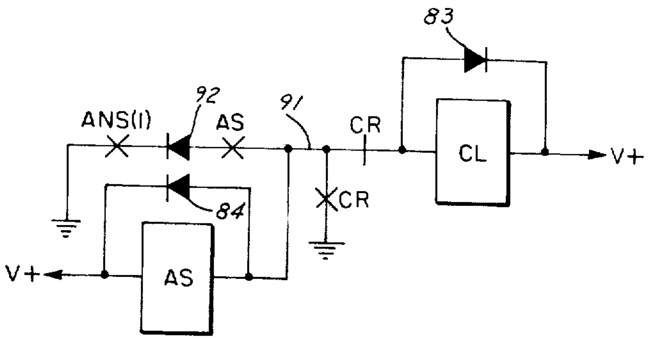
Figure 8C:
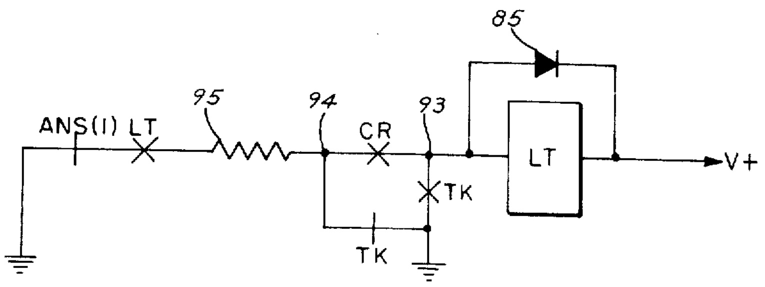

Referring to FIGS. 8*a*–8*c*, the relays ST, AS, CL and LT are there shown. Connected, respectively, across the terminals of each of these relays are diodes 82–85 to limit current flow through the relay coils.

Shown in FIG. 8*a* is the ST relay. The ST relay has one terminal connected to ground and its other terminal connected to the electrical lead 88. Parallel connected between the lead 88 and an electrical lead 89 are a set of normally open contacts of the LS and ST relays. Connected in parallel between the lead 89 and an electrical lead 90 are a set of normally open contacts of the CR and TK relays. Lead 89 is connected directly to the CR relay, FIG. 2. V− voltage is connected to the lead 88. V− is also connected to the lead 90.

The AS and CL relays are shown in FIG. 8*b*. One terminal of the CL relay is connected to V+ voltage and its other terminal is connected through a normally closed set of relay contacts of the CR relay to an electrical lead 91. Ground is connected to the lead 91 through a normally open set of contacts of the CR relay. Ground is also connected to the lead 91 through an electrical path defined by the series connection of a normally open set of contacts of the ANS(1) relay, a diode 92 and a normally open set of contacts of the As relay. One terminal of the AS relay is connected to the lead 91. The other terminal of the As relay is connected to V+ voltage.

Referring to FIG. 8c, the LT relay is shown. One terminal of the LT relay is connected to V+ voltage and its other terminal is connected to junction point 93. A normally open set of contacts of the CR relay is connected between the junction point 93 and a junction point 94. A normally open set and a normally closed set of contacts of the TK relay are connected, respectively, between ground and the junction points 93 and 94. Ground is connected to the junction point 94 through an electrical path defined by the series connection of a normally closed set of contacts of the ANS(1) relay, a normally open set of contacts of the LT relay and a resistor 95. The deenergized state of the LT relay indicates that the called telephone line has been transferred to the computer interface 12 by means of the operation of ANS(1) relay.

Figure 9:
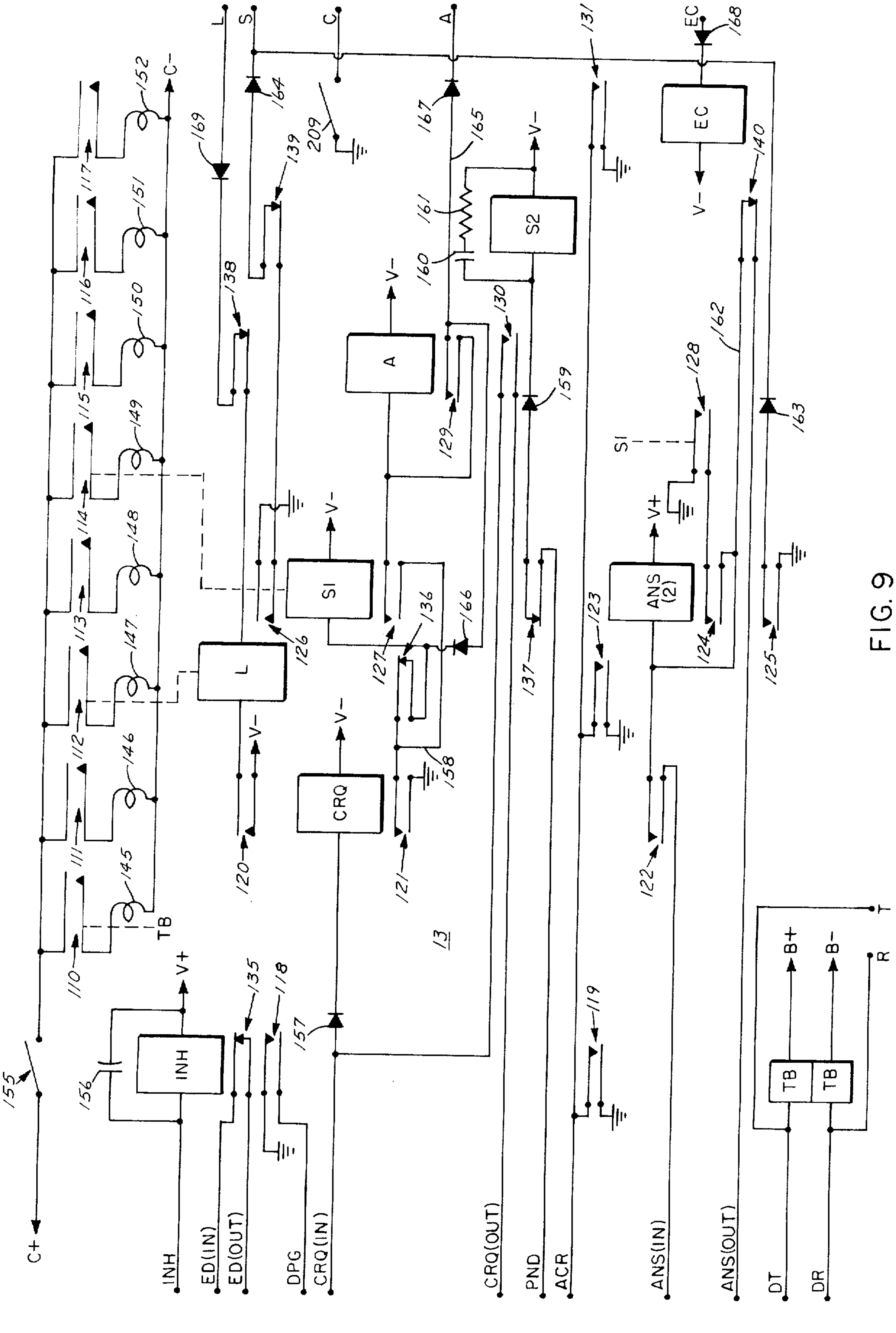
FIG. 9 is a circuit diagram of the trunk interface circuit of FIG. 1.

The trunk interface circuit 13 is shown in FIG. 9. The trunk interface 13 has the leads INH, ED(IN), ED(-OUT), DPG, CRQ(IN), CRQ(OUT), PND, ACR, ANS(IN), ANS(OUT), DT and DR which extend from the calling unit 11 and the leads L, S, C, A and EC which extend from the applique circuit 15. The trunk interface 13 includes relays INH, TB, CRQ, L, ANS, SI, A, 52 and EC; normally open sets of relay contacts 110–131; normally closed sets of relay contacts 135–140; and status lamps 145–152. Each relay in the trunk interface 13 operates those relay contacts which are shown in alignment therewith or shown connected by a dotted line in FIG. 9.

The status lamps 145–152 have one terminal connected to C– voltage and their other terminal connected, respectively, to the relay contacts 110–117. The other terminal of the relay contacts 110–117 is connected through a manually operable on-off switch 155 to C+ voltage.

The relay INH has one terminal connected to the INH lead, its other terminal connected to V+ voltage, and a capacitor 156 connected across its terminals to slow the relay's release. The INH relay operates the relay contacts 118 and 135. The relay contacts 135 connect the ED(IN) and ED(OUT) leads, and the relay contacts 118 connect the DPG lead with ground.

The TB relay is made up of two high impedance relay windings. One winding of the TB relay is connected between the DT lead and B+ voltage. The other TB relay coil is connected between the DR lead and B– voltage. Each of the TB relay windings operates the relay contacts 110 and 119. The contacts 119 connect the ACR lead with ground.

The CRQ relay has one terminal connected to V– voltage and the other terminal connected through a diode 157 to the CRQ(IN) lead. The CRQ lead operates relay contacts 111 and 120–122. The make first contacts 120 connect one terminal of the L relay with V– voltage; the contacts 121 connect ground with an electrical lead 158; and the contacts 122 interconnect the ANS(IN) lead and one terminal of the ANS relay. The other terminal of the ANS relay is connected with V+ voltage.

The L relay has its other terminal connected through relay contacts 138 and diode 169 to the L lead. The L relay operates relay contacts 112, 136 and 123. The contacts 136 connect the lead 158 to one terminal of the S1 relay. The other terminal of the S1 relay is connected to V– voltage. The contacts 123 connect the ACR lead to ground.

The ANS(2), FIG. 9, relay operates the relay contacts 113, 137, 124 and 125. The contacts 137 connects the PND lead through a diode 159 with one terminal of the S2 relay. The S2 relay has its other terminal connected to V– voltage and a series connected capacitor 160 and a resistor 161 connected across its terminals to slow the release time of the relay coil. The first make contacts 124 have one terminal connected to an electrical lead 162 extending from the terminal of the ANS relay connected to the contacts 122. The other terminal of the contacts 124 is connected through the S1 relay contacts 128 to ground. The contacts 125 connect ground through diode 163 to the S lead.

The S1 relay operates the relay contacts 114 and 126–128. One terminal of the make first contacts 126 is connected to ground. The other terminal of the contacts 126 is connected through the S2 relay contacts 139 and a diode 164 to the S lead. The contacts 127 interconnect the lead 158 with one terminal of the A relay. The other terminal of the A relay is connected to V– voltage.

The A relay operates the relay contacts 115, 129–139 and 138. The contacts 129 interconnect the A relay terminal connected with contacts 127 of the S-1 relay to an electrical lead 165. The S1 relay terminal connected with the contacts 136 is connected through a diode 166 to the lead 165. The A lead is also connected to the lead 165 through a diode 167. The contacts 130 interconnect the CRQ(IN) and CRQ(OUT) leads. Contacts 138 of the A relay disconnect the L lead from the L relay coil through diode 169.

The S2 relay operates the relay contacts 116, 139 and 140. The contacts 140 disconnect the leads 162 and ANS(OUT). Contacts 139 disconnect ground through the contacts 126 of the S-1 relay and diode 164 from the S lead. The EC relay has one terminal connected to V– voltage and its other terminal connected through the diode 168 to the EC lead. The EC relay operates the relay contacts 117 and 131. The contacts 131 connect the ACR lead with ground.

Figure 10:
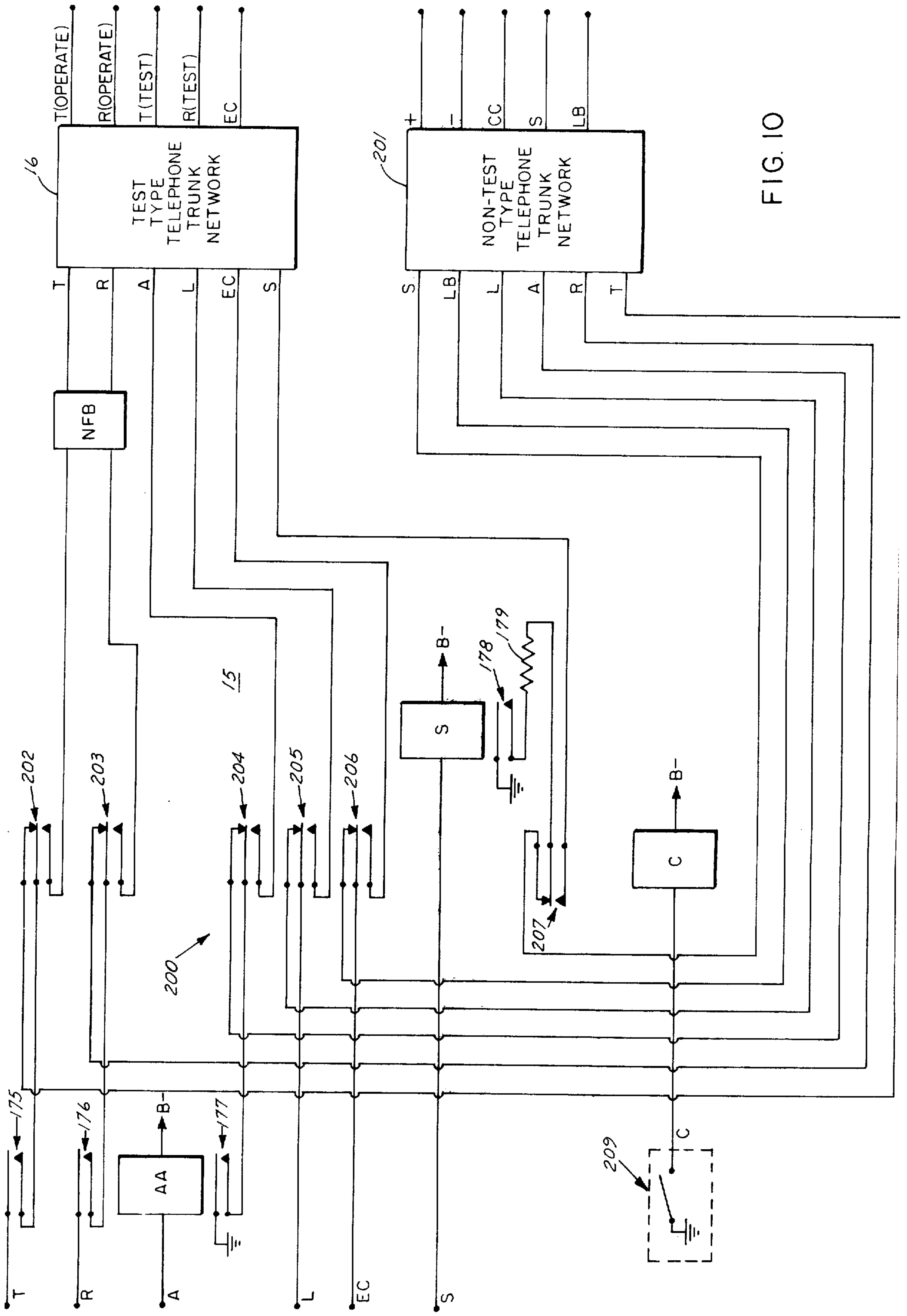
FIG. 10 is an embodiment of applique circuit which is arranged for selectively connecting the remote meter reading system of FIG. 1 to one or the other of two representative types of telephone test trunk circuits.

Referring to FIG. 10, the applique circuit 15 is shown. The applique circuit 15 operates to connect the leads T, R, A, L, EC, S and C of the meter reading system with the test trunk 16 which can be a standard step by step "strowger" type telephone office or alternately with a standard non-test common control telephone test trunk circuit 201.

The test trunk circuits 201 and 16 provide access alternatively to a selected remote telephone office unit 201*a* or 16*a* each having up to 10,000 subscriber telephone lines. The function of circuit 15 is to repeat and provide the appropriate electrical functions as sent by the remote trunk interface circuit 13 and functions to interconnect a selected subscriber line to the remote meter reading system.

Each access to a remote 10,000 line common control telephone office unit 20*a* is associated with the circuitry 201 which consists of five electrical lines designated +, −, CC, S and LB.

Each access to a remote 10,000 line step by step stowger type telephone office unit 16*a* associated with circuitry 16 is made up of five electrical leads designated T (operate), R (operate), T (test), R (test) and EC.

The switching arrangement for connecting the applique circuit 15 to one or the other of the telephone test trunk networks 201 or 16 is made up of relay C having sets of relay contacts 202 to 207. The relay contacts 202, 203, 204, 205, 206 and 207 are, respectively, associated with the T, R, A, L, EC, LB and S leads. When the C relay is deenergized the applique circuit designated as 200 is connected to the common control test trunk 201. Energization of the C relay connects the qpplique circuit 200 to the step by step stowger type test trunk 16.

The C relay has one terminal connected to B− voltage and is remotely energized by the closing of switch 209 to apply ground to its other terminal C. Switch 209 may conveniently be under the control of the computer hardware. The switch 209 is shown enclosed by a broken line to indicate that it is located remotely from the applique circuit 200. The switch 209 is preferably located with the test trunk interface circuit 13, while the applique circuit 200, and test trunk circuits 201 and 16 are located at the central telephone company office. It is noted that the leads T, R, A, L, LB and S of the common control test trunk 201 correspond in function, respectively, to leads T, R, A, L, EC and S of the step by step stowger type test trunk 16.

The T and R leads extend between the calling unit 11 and the applique circuit 15 of the central telephone office and are switched through this circuit to the remote 10,000 line central office test trunk 16 or 201. The EC lead extends from the trunk interface circuit 13 through the applique circuit 15 to the remote 10,000 line telephone office test trunk 16 or 201. Control leads L, S, C and A extend between the trunk interface circuit 13 and the applique circuit 15 of the central telephone office.

The leads T and R are utilized to extend pulsing or tone signals to the remote 10,000 line units 102*a* or 16*a* to select the telephone number corresponding to that of the stored computer program. The T and R leads are also utilized to interrogate the transponder located across the standard subscriber's line and to monitor the subscriber's line for off-hook conditions. Lead EC is utilized to monitor the test train during access of the selected subscriber's line. Should a busy test train or a busy subscriber's line be encountered, ground will be extended to relay EC of the trunk interface circuit 13. Relay EC which has one terminal connected to V− voltage will operate closing its contacts 131 which signal the calling unit 11 and the computer hardware 10 to abort the call attempt. The lead L is utilized to monitor the central telephone office test network. Should the specific central telephone office test trunk be in use by the telephone company a ground will be returned from the test trunk over lead L to the trunk interface circuit. Relay L which has one terminal connected to V− voltage through the CRQ contacts 120 will operate its contacts 123 which will signal the calling unit 11 and the computer hardware 10 to abort the call attempt.

The A lead extends from the test trunk interface circuit 13 and is connected to one terminal of the AA relay. The other terminal of the AA relay is connected to B− voltage. The AA relay operates the relay contacts 175–177. The contacts 175 and 176 interconnect, respectively, the T leads and R leads extending from the calling unit 11 and the test trunk network 16 or 201. The contacts 177 connect the A lead extending from the trunk network 16 or 201 to ground through contacts 204.

The S relay has one terminal connected to the S lead extending from the trunk interface 13 and its other terminal connected to B− voltage. The S relay operates the relay contacts 178. One terminal of the contacts 178 is connected to ground. The other terminal of the contacts 178 is connected through a resistor 179 to the S lead extending to the trunk networks 16 or 201 through contacts 207. Pl In operation, the meter reading system makes a data call to a selected telephone number in the manner hereinafter described. The computer hardware 10 generates a call request signal CRQ in the form of a positive voltage on the CRQ lead. This positive voltage drives the relay driver 25, shown in FIG. 2, in the calling unit 11 to generate a V+ voltage on the CRQ(IN) lead. The V+ voltage on the CRQ(IN) lead in the calling unit 11 is extended to the CRQ(IN) lead in the trunk interface circuit 13 shown in FIG. 9. It is noted that the meter reading system will not operate to make a data call unless V− voltage is supplied to the calling unit 11. The presence of V− voltage energizes the PI relay shown in FIG. 8*b* so that V+ voltage appears on the CRQ(OUT) lead shown in FIGS. 1 and 2. The V+ voltage on the CRQ(OUT) lead is transmitted to and enables the computer 10.

The presence of V+ voltage on the CRQ(IN) lead energizes the CRQ relay. Energization of the CRQ relay turns on the call request status lamp 146, connects V− voltage to one terminal of the L relay, grounds the lead 158 and connects the ANS(IN) lead to the ANS relay. The application of V− voltage to one terminal of the L relay tests the remote central telephone office test trunks 16 or 201 to determine if it is in an idle state or being used by the central telephone company office. It is noted that the switch 155 is closed so that the status lamps 145–152 may be selectively illuminated.

If the remote test trunk 16 or 201 are busy, a ground on the L lead is extended from the test trunks 16 or 201 through the applique circuit 15 to the trunk interface 13. The L relay, thus, operates illuminating the status lamp 147, opening the contacts 136 to remove the ground from the S1 relay and closing the contacts 123 to ground the ACR lead. Grounding of the ACR lead operates the ACR relay, shown in FIG. 6, through the electrical path defined by the normally closed contacts of the TK relay. Energization of the ACR relay closes the normally open ACR relay contacts so that the interface circuit 60, shown in FIG. 7, applies an abort signal, such as V+, to the computer interface 12, shown in FIG. 1. The computer interface 12 forwards the abort signal to the computer 10 on the ACR(IN) lead and the computer 10, upon receipt of the abort signal, aborts the data call and resets the meter reading system. The computer 10 may be programmed to automatically attempt to replace the data call again after a predetermined time interval.

If the remote test trunk 16 or 201 are not busy, but rather are idle or free, no signal is applied to the L lead to operate the L relay. Thus, the L relay shown in FIG.

9 does not operate and the ground applied to lead 158 by closure of the contacts 121 is transmitted through the contacts 136 to operate the relay S1. Relay S1 in operating closes contacts 127 and applies ground on lead 158 to the A relay of the trunk interface circuit 13 shown in FIG. 9. The A relay operates and through contacts 129 applies ground through diode 167 to the A lead of the applique circuit 15 shown in FIG. 10. Ground applied to the A lead of FIG. 10 energizes the AA relay closing contacts 175 to 177 thus applying ground to the respective A leads of the test trunks 16 or 201 and to connect the T, R, leads from the test trunks 16 or 201 to the calling unit 11.

Energization of the relay S1 closes the contacts 114 to illuminate the status lamp 149. Operation of the S1 relay also closes the contacts 126 to extend a ground on the S lead to operate the S relay shown in FIG. 10 in the applique circuit 15. Operation of the S relay extends a ground to the S lead of the trunk network 16 or 201 to connect the T(tip) and R(ring) of the calling unit 11 to the T(test) and R(test) of the remote 10,000 line unit **16*a* or 201*a*. Operation of the trunk interface relay A, FIG. 9, illuminates the status lamp 150 and opens the contacts 138 connected in series with the L relay to prevent energization of the L relay. Operation of the trunk interface A relay, FIG. 9, also closes the contacts 129 to supply a locking ground to the relay S-1 through diode 166; and closes the contacts 130 to connect the CRQ(IN) and CRQ(OUT) leads and transmit V+ voltage of the CR relay in the calling unit 11**.

The CR relay is shown in FIG. 2. Transmission of V+ voltage thereto over the CRQ(OUT) lead operates the Cr relay to signal the calling unit 11 that the trunk network 16 or 201 is seized and ready to receive pulsing from the dial pulse or tone generator 33, shown in FIG. 4. Energization of the CR relay starts the ACR timer 50, shown in FIG. 6, be removing V+ voltage from the timer terminal 51 to start the timer 50, and energizes the LS relay. Energization of the CR relay also operates the LT relay shown in FIG. **8*c* by applying a ground through the normally closed TK relay contacts and operates the AS relay shown in FIG. 8*b* by applying a ground through lead 91**.

Energization of the LS relay operates the ST relay shown in FIG. **8*a* through normally open CR contacts. Operation of the ST relay applies a ground to the interdigit timer terminal 36 through the CR and DP contacts to trigger the timer 32, FIG. 4, to generate a relay energizing output on its output terminal 37. This energizing output is transmitted from the interdigit timer output terminal 37 through the ED(IN) lead; the trunk interface contacts 135 shown in FIG. 9 which are closed at this time; and the ED(OUT) lead to operated the PND relay shown in FIG. 4. Operation of the PND relay closes its normally open contacts to maintain a ground on the terminal 36**.

With the PND relay energized, its normally open relay contacts are closed. As a result, V+ voltage is transmitted from the terminal 62 of the interface circuit 60 shown in FIG. 7 on the PND lead to the computer 10. Ground is also connected through the normally open contacts of the PND relay to the PND lead of FIG. 4. The ground on the PND lead extends to the trunk interface S2 relay shown in FIG. 9 to operate the S2 relay. Operation of the S2 relay opens the contacts 139 to remove the ground from the S lead; opens the contacts 140 to break the connection between the ANS(IN) and ANS(OUT) leads; and illuminates the status lamp 151. Removal of the ground from the S lead deenergizes the S relay in the applique circuit 15, shown in FIG. 10, to transfer the T and R leads of the trunk network 16 from T(test), R(test) to T(operate), R(operate) or to prepare the trunk network 201 for tone or pulsing inputs. Operation of the PND relay also resets the ACR timer 50 shown in FIG. 6 by connecting V+ voltage to timer terminal 51.

The computer 10 in response to the V+ voltage signals received on the DLO and PND leads from the calling unit 11 sets the number signals representing the first digit of a telephone number to be dialed on the NB1, NB2, NB4, NB8 leads and then generates a pulse indicating digit present on its DPR lead to drive the DP relay shown in FIG. 3 through the relay driver 27. The relay 27 operates the DP relay by applying a ground to the output lead 28 and, once energized, the DP relay is held energized by the ground applied to the lead 28 through the closed sets of normally open contacts of the DP and PND relays.

Operation of the DP relay simultaneously enables the interface gates 30 and the dial pulse and tone generator 33, shown in FIG. 4, by breaking the ground connection to the terminals 35 and 38. It is noted that ground is removed from the pulse generator terminal 38 by the energization of the DP relay since the PND relay is energized.

The enabled gates 30 operate in the manner hereinbefore described to set the digit to be dialed present on the leads NB1, NB2, NB4, NB8 into the counter 31 on leads N1, N2, N4 and N8. The stages of the counter 31 are thus initially set with the digit to be dialed. It is noted that the counter stages were reset for receiving a digit to be dialed by a ground applied on lead RS through the normally closed PND contacts when the ST relay was first energized.

The enabled pulse or tone generator 33 generates dial pulses or tones on its output leads T and R which are transmitted to the trunk networks 16 or 201 to dial a selected digit and clock pulses on its output lead TR which are in time correspondence with the dial pulses or tones. The stages in the counter 31 are triggered or counted down to zero by these clock pulses. The counter 31 operates once its stages are counted down to zero to generate the end of count or end of digit output E. The output E is transmitted to the interdigit timer 32 and triggers the timer to generate a relay deenergizing output on the timer terminal 37. The relay deenergizing output is transmitted through the ED(IN) lead, the contacts 135 in the trunk interface 13 and the ED(OUT) lead to deenergize the PND relay. Deenergization of the PND relay disables the pulse or tone generator 33 by applying a ground to terminal 38 and resets the counter 31 for receiving the next digit to be dialed by applying a ground on the RS lead. Since the pulse or tone generator 33 is deenergized the instant the counter 31 is counted down to zero, the number of dial or tone pulses transmitted to the telephone line switching circuitry associated with the test trunk 16 or 201 equals the digit to be dialed received from the computer 10 which has been pulse or tone dialed on the trunk network 16 or 201.

Deenergization of the PND relay also removes the ground connected to the lead 28 shown in FIG. 3. Thus, the DP relay is released and deenergises. Deenergization of the DP relay closes its normally closed contacts so that ground is reapplied to the interdigit timer terminal 36 through the DP and CR relay contacts.

Reapplication of ground to interdigit timer terminal 36 operates after a predetermined built-in delay, such as 600 milliseconds, to retrigger the timer 32 into the state in which a relay energizing output is present on its output terminal 37. Thus, the PND relay is reenergized and V+ voltages are again received by the computer 10 on the DLO and PND leads to indicate that the system is ready for the next digit.

The computer 10 then automatically sets the next digit to be dialed on its NB1, NB2, NB4, NB8 leads and generates a pulse or tone indicating digit present on its DPR lead to drive the DP relay, FIG. 3. The system thus operates in the manner hereinbefore described to sequentially dial in the order programmed consecutively each of the digits of the subscriber's telephone number being called, thereby to connect the test trunk 16 or 201 to the set of telephone lines T and R in the 10,000 line unit 16*a* or 201*a* assigned to the telephone number called.

It is noted that after each digit is dialed that the S2 relay shown in FIG. 9 is released upon deenergization of the PND relay since the ground is removed from the PND lead. Thus, the applique circuit S relay is operated and the trunk leads T and R are transferred back to the T(test) and R(test) lines within trunk circuit 16.

Should a busy switch train or subscriber's line be encountered during the dialing of a telephone number, a ground appears on the EC lead. The ground signal on the EC lead extends through the applique circuit 15 to the trunk interface circuit 13 to operate the EC relay shown in FIG. 9. Operation of the EC relay closes the contacts 117 to illuminate the status lamp 152 and closes the contacts 131 to ground the ACR lead. The grounding of the ACR lead operates the ACR relay shown in FIG. 6 to cause the system to abort the data call in the manner hereinbefore described.

As beforementioned the ACR timer 50 shown in FIG. 6 is started by operation of the CR relay and stopped by operation of the PND relay. The ACR timer 50 functions to generate an output on terminal 52 to operate the ACR relay and abort a data call if the PND relay does not operate within a predetermined time interval, such as 40 seconds, after the CR relay has been energized.

Also as beforementioned, operation of the CR relay operates the LT relay shown in FIG. 8*c*. It should be noted that release of the LT relay closes its normally closed relay contacts to make the connection in the calling unit 11 between the DR, R leads and T, DT leads shown in FIG. 5.

After the final digit of the telephone number has been dialed, the PND relay is again energized in the manner above-described as if another digit were to be dialed. Thus, the computer 10 again receives V+ voltages on the PND and DLO leads. The computer 10 now sets the end of number code on its NB leads and generates a pulse or tone on the DPR lead to operate the DP relay. The end of number code used in the system here described is the setting of a binary one on the number leads NB4 and NB8.

The end of number detector 34 shown in FIG. 4 generates a relay energizing ground output on its terminal 39. The output signal on terminal 39 is transmitted over the INH lead to the INH relay, shown in FIG. 9, and operates the INH relay. Energization of the INH relay opens contacts 135 and closes contacts 118. The opening of the contacts 135 breaks the connection between the ED(IN) and ED(OUT) leads to disable the PND relay. The closure of the contacts 118 applies a ground to the DPG lead to ground the terminal 38 of the dial pulse or tone generator 33, thereby to disable or inhibit the pulse or tone generator 33 shown in FIG. 4 to prevent the dialing of another digit.

The relay energizing output on the end of number detector terminal 39, shown in FIG. 4, is also transmitted through the DP relay contacts on the ANS(IN) lead to the trunk interface ANS relay to operate it. Operation of the trunk interface ANS relay, shown in FIG. 9, closes contacts 113 to illuminate the status lamp 148, opens the contacts 137 to release the S2 relay, closes the contacts 124 to supply a ground through the contacts 128, 124 to hold the ANS relay energized, and closes the contacts 125 to ground the S lead.

Deenergization of the S2 relay closes the contacts 139 to supply a holding ground to the S lead and closes the contacts 140 to connect the ANS(IN) and ANS(-OUT) leads in FIG. 9.

The grounding of the S lead operates the S relay in the applique circuit 15 to transfer the T and R leads of the trunk network 16 from the accessed T(operate), R(operate) lines to the T(test), R(test) lines or perform a switching function of a similar nature within the trunks 201 and 201*a*. It is noted that during the pulse or tone dialing of each telephone number digit in 16 or 16*a*, the T and R trunk network leads are switched to the T(operate) and R(operate) lines or dialing lines.

With the ANS(IN) and ANS(OUT) leads connected in the trunk interface 13, shown in FIG. 9, the ground appearing on the ANS(IN) lead is transmitted through the ANS(OUT) lead to operated the calling unit ANS relay shown in FIG. 4. Operation of the calling unit ANS relay generates an answer signal, releases the LT relay shown in FIG. 8*c*. Deenergization of the LT relay connects the leads DR, R and DT, T shown in FIG. 5, thereby to transfer the R, T leads extending from the trunk network 16 or 201 to the computer interface 12.

As shown in FIG. 1, the V+ voltage on the DSS(start) lead is transmitted from the calling unit 11 to the computer interface circuit 12. The computer interface 12 in response to the V+ voltage on the DSS(start) lead generates a selected frequency or coded signal to interrogate the transponder 17. The selected tone or coded signals are transmitted to the transponder 17 via the T and R leads from 12 to 13, DT and DR leads from 13 to 11, T and R leads from 11 to 15, and T and R leads from 15 to 16; the T(test) and R(test) lines from 16 to 16*a*, and the accessed T and R telephone lines of the 10,000 line unit 16*a* from 16*a* to 17. In interrogating through test trunk 201, the signals are transmitted via T and R leads from 15 to 201, + and − leads from 201 to 201*a*, T and R leads from 201*a* to 17. To provide security of the telephone company test network, a narrow band pass filter, NBF, is provided within the applique circuitry at the centrally located telephone office and selected to eliminate transfer of normal speech frequencies but readily passes the transponder or computer interface interrogation signals.

A plurality of transponders 17 may be required to interrogate a plurality of transducers, each adapted to convert a to be measured parameter to a unique electrical signal. Each transponder 17 would be triggered by a unique selected code or tones and outputs suitable coded signals containing the meter readings of the three meters 19. The coded data is transmitted to the computer interface circuit 12 via telephone lines T, R; the trunk lines T(test), R(test); and the systen's T, R leads. The computer interface 12 checks the coded data and forwards the data along with the appropriate stop and start bits to the computer 10.

The computer 10 reads in and checks the incoming meter reading data to determine if it is complete. Once all the incoming data has been read in by the computer 10 and determined to be complete, the computer 10 removes the signal from the CRQ lead driving the relay driver 25 to release the CR relay shown in FIG. 2 and the CRQ relay shown in FIG. 9. Deenergization of the CR and CRQ relays releases all other operated relays in the meter reading system. Thus, the meter reading system returns to an idle state. The meter reading system is now ready to make another data call upon command of the computer 10.

It is noted that if the telephone set 18 called goes off-hook during the time period when the computer interface circuit 12 is connected to the trunk leads T and R, the TB relay shown in FIG. 9 operates to close the contacts 110 to illuminate the status lamp 145 and to close the contacts 119 to ground the ACR lead. Grounding the ACR lead operates the ACR relay to cause the system to abort the data call. Thus, if a called subscriber places a telephone call during the time data is being outputted from transponder 17, the telephone call of the subscriber is given priority and the data call is automatically aborted when the telephone receiver is lifted. Lifting of the receiver on the called telephone set operates to place relay energizing signals on the T and R telephone lines and these signals are transmitted via the T, R systems leads and DT, Dr leads to the TB relay.

Thus, an improved remote meter reading system has been provided.

What is claimed is:

1. A system for reading transducers located at a plurality of remote locations, comprising:

a plurality of sets of telephone lines, one set of telephone lines extending to each of said locations, with a set of telephone lines being associated with a selected telephone number or numbers;

centrally located test trunk means providing access to said plurality of sets of telephone lines;

telephone line switching circuitry associated with said plurality of sets of telephone lines, said switching circuitry being operable in response to a series of dial or tone pulses representing a selected telephone number to connect said set of telephone lines associated therewith to said trunk means;

at least one transponder and transducer means associated with each of said remote locations, each of said transponder means being connected to its associated transducers and to said set of telephone lines extending to its associated remote location, each of said transponder means being operable to read the transducers to which it is connected and output, when triggered by a unique trigger signal, data representing the readings on the transducers read, each of said transponder means receiving said trigger signal and outputting said transducer reading data on said set of telephone lines to which it is connected;

computer means for selectively generating a call request signal to initiate a data call, for selectively outputting number signals representing the digits of a telephone number to be called, and for reading in and processing said transducer reading data outputted by said transponder means;

first means connected between said computer means and said trunk means for seizing said trunk means, said first means being operable to seize said trunk means if said trunk means is free, said computer means being operable when said trunk means is seized to output said number signals;

second means for pulse or tone dialing a selected telephone number, said second means being operable in response to said call request signal and said number signals from said computer means to pulse or tone dial said telephone line switching circuitry to connect said set of telephone lines associated with the telephone number represented by said number signals to said trunk means, said computer means being operable to generate an end of number signal when all digits of a telephone number have been outputted to said second means;

third means for determining during the pulse or tone dialing of a selected telephone number is a switch encountered in said telephone line switching circuitry is busy or if said set of telephone lines called is in use, said trunk means being operable to generate a line busy signal if a dial pulse or tone encounters a busy switch in said telephone line switching circuitry or said set of telephone lines called is in use, said third means being operable to transmit an abort signal to said computer means in response to said line busy signal and said computer means being operable to abort the data call in response to said abort signal and reset said transducer reading system;

fourth means connected to receive said end of number signal, said fourth means being operable in response to said end of number signal to generate an interrogation start signal;

fifth means for transmitting said transducer reading data to said computer means, said fifth means being responsive to said interrogation start signal to connect said set of telephone lines accessed by said trunk means to said computer means; and sixth means for triggering said transponder means, said sixth means being connected to said fifth means and responsive to said interrogation start signal to generate said trigger signal operable to trigger said transponder means and transmit said trigger signal thereto over said set of telephone lines accessed by said trunk means whereby said transponder means is triggered and said transducer reading data is transmitted through said set of telephone lines accessed and said fifth means to said computer means, said computer means being operable to reset said transducer reading system for another data call when said transducer reading data read in is complete.

2. The invention defined in claim 1, wherein a telephone set is associated with each of said sets of telephone lines and including seventh means connected between said computer means and said trunk means for determining if the telephone set associated with said set of telephone lines accessed has gone off-hook, said trunk means being operable to generate an off-hook signal if the telephone set associated with said set of telephone lines accessed is off-hook, said seventh means being operable to transmit an abort signal to said computer means in response to said off-hook signal and said computer means being operable to abort the data call in response to said abort signal and reset said transducer reading system.

3. The invention defined in claim 2, including a plurality of said trunk means with associated transponder means, transducers to be read and telephone sets, and switching means for connecting any selected one of said trunk means into said reading system.

4. The invention defined in claim 2, wherein said trunk means is operable to generate a trunk busy signal when is use, said first means, for seizing said trunk means, is operable to transmit an abort signal to said computer means in response to said trunk busy signal, and said computer means is operable to abort the data call in response to said abort signal and reset said transducer reading system.

5. The invention defined in claim 2, wherein said trigger signal is a tone of a predetermined frequency or a code and said sixth means is operable to generate said tone of predetermined frequency or code in response to said interrogation start signal.

6. The invention defined in claim 2, wherein said sixth means is operable to check the completeness of said transducer reading data transmitted to said computer means and to process said transducer reading data to make it compatible with said computer means.

7. The invention defined in claim 2, wherein:

said computer means is operable to output said number signals representing each digit or tone of the telephone number being called serially along with a digit present signal; and, said second means for pulse or tone dialing a selected telephone number includes interface gate means, dial or tone pulse generator means, pulse or tone counter means and interdigit timer means, said interface gate means being operable in response to said digit present signal to set said number signals representing the next digit to be dialed into said counter means, said dial pulse or tone generator means being operable in response to said digit present signal to generate dial pulses or tones which dial said telephone line switching circuitry, said counter means being operable to count the number of dial pulses or tones generated by said pulse or tone generator means and generate an end of digit signal when the number of dial pulses or tones counted equals the digit to be dialed set into said counter means, said interdigit timer means being operable in response to said end of digit signal to generate signals to inhibit said pulse or tone generator means and reset said counter means and to generate after a predetermined time delay a next digit signal, said computer means operable in response to said next digit signal to output said number signals representing the next digit of the telephone number to be dialed or if the last digit of the telephone number has been dialed to output said end of number signal.

8. The invention defined in claim 7, including: eighth means responsive to said end of digit signal and said next digit signal for measuring the time elapsed between the dialing or tone signalling of consecutive digits and transmitting, if the time elapsed exceeds a preset time period, an abort signal to said computer means; said computer means being operable to abort the data call in response to said abort signal and reset transducer reading system.

9. The invention defined in claim 8, wherein:

first, second, third, fourth and fifth lines extend between said trunk means and said telephone line switching circuitry, said first and second lines being used during the pulse or tone dialing of a telephone number, said third line being connected to transmit a busy signal to said trunk means whenever said telephone set connected to said accessed set of telephone lines is in use when called, said fourth and fifth lines being connected to transmit an off-hook signal to said trunk means whenever said accessed telephone set goes off-hook; and, said trunk means is selectively switchable for accessing said first and second lines or said fourth and fifth lines; and including:

ninth means responsive to the seizure of said trunk means, said next digit signal, said end of digit signal and said end of number signal to transmit switching signals to said trunk means to switch said trunk means to access said first and second lines during the dialing of telephone number digits and to switch said trunk means to access said fourth and fifth telephone lines during the time between the dialing of consecutive telephone number digits and the time after the last digit has been dialed.

10. In a transducer reading system wherein a telephone number calling unit is programmed by a computer to dial data calls to selected telephone numbers by operating telephone line switching circuitry to connect a selected set of telephone lines through a telephone trunk circuit to the computer and a transducer reading transponder associated with said selected set of telephone lines transmits transducer reading data over said set of telephone lines to said computer, the improvement in combination therewith of means for aborting a data call and resetting said transducer reading system whenever a switch in said telephone line switching circuitry encountered is busy or said set of telephone lines called is busy.

11. The invention defined in claim 10, including means for aborting a data call and resetting said transducer reading system whenever said telephone trunk circuit is busy.

12. The invention defined in claim 10, wherein at least one telephone set is associated with each of said sets of telephone lines and including means for aborting a data call and resetting said transducer reading system whenever a telephone set associated with said selected set of telephone lines called goes off-hook.

13. The invention defined in claim 10, including means for aborting a data call and resetting said transducer reading system whenever the time between the dialing of consecutive digits of a selected telephone number exceeds a predetermined length.

14. A system for reading transducers located at a plurality of remote locations, comprising:

computer means programmed to output number signals representing selected telephone numbers and operable to read in data signals representing transducer readings;

telephone number calling means responsive to said number signals representing each telephone number outputted by said computer means to generate call signals corresponding thereto;

a plurality of sets of telephone lines, one of said sets of telephone lines extending to at least one of said remote locations;

test trunk means providing access to said plurality of sets of telephone lines;

telephone line switching circuitry associated with said plurality of sets of telephone lines, said switching circuitry being responsive to said call signals to access said sets of telephone lines having the telephone number corresponding to said call signals by connecting it to said trunk means;

means connecting said computer means through said trunk means with said set of telephone lines selectively accessed by said telephone line switching circuitry;

transducer reading transponder means at each of said remote locations connected to said set of telephone lines extending thereto, said transponder means being operable when at least one of its associated sets of telephone lines is accessed by said telephone lines switching circuitry to transmit transducer reading data signals over said set of telephone lines to said computer; and, means for aborting a call and resetting said transducer reading system whenever a switch in said telephone line switching circuitry encountered is busy or said set of telephone lines called is busy.

15. The invention defined in claim 14, including means for aborting a call and resetting said transducer reading system whenever said trunk means is busy.

16. The invention defined in claim 14, wherein at least one telephone set is associated with each of said sets of telephone lines and including means for aborting a call and resetting said transducer reading system whenever the telephone set associated with said selected set of telephone lines called goes off-hook.

17. The invention defined in claim 14, including means for aborting a call and resetting said transducer reading system whenever the time between the calling of consecutive digits of a selected telephone number exceeds a predetermined length.

18. The invention defined in claim 14, wherein:

said trunk means is centrally located; and, said computer means and telephone number calling means are located remotely from said trunk means.

19. The invention defined in claim 18, wherein at least one telephone set is associated with each of said sets of telephone lines and including:

means for aborting a call and resetting said transducer reading system whenever said trunk means is busy;

means for aborting a call and resetting said transducer reading system whenever a telephone set associated with said selected set of telephone lines called goes off-hook; and, means for aborting a call and resetting said transducer reading system whenever the time between the calling of consecutive digits of a selected telephone number exceeds a predetermined length.

20. A method of reading transducers at a plurality of remote locations through a centrally located test trunk circuit which provides access to a plurality of sets of telephone lines extending to said remote locations, comprising:

making a data call by selectively accessing in a programmed sequence said sets of telephone lines;

transmitting transducer reading data over said sets of telephone lines when accessed;

reading out through said trunk circuit transducer reading data transmitted on said accessed set of telephone lines; and, aborting a data call whenever said trunk circuit is busy, said set of telephone lines being called is busy or the telephone set associated with said set of telephone lines being called goes off-hook.

21. The method defined in claim 20, wherein said sets of telephone lines are accessed through telephone line switching circuitry associated with said trunk circuit and including aborting a data call whenever busy switching circuitry is encountered.

* * * * *